(12) United States Patent
Park et al.

(10) Patent No.: US 9,556,364 B2
(45) Date of Patent: Jan. 31, 2017

(54) PRESSURE SENSITIVE ADHESIVE COMPOSITION FOR TOUCH PANEL

(75) Inventors: Min Soo Park, Daejeon (KR); Se Woo Yang, Daejeon (KR); Suk Ky Chang, Daejeon (KR); Woo Ha Kim, Daejeon (KR); Yoon Tae Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 61 days.

(21) Appl. No.: 13/880,611

(22) PCT Filed: Oct. 20, 2011

(86) PCT No.: PCT/KR2011/007812
§ 371 (c)(1),
(2), (4) Date: Apr. 19, 2013

(87) PCT Pub. No.: WO2012/053830
PCT Pub. Date: Apr. 26, 2012

(65) Prior Publication Data
US 2013/0201145 A1   Aug. 8, 2013

(30) Foreign Application Priority Data

Oct. 20, 2010 (KR) .................. 10-2010-0102237
Oct. 19, 2011 (KR) .................. 10-2011-0106917

(51) Int. Cl.
| | | |
|---|---|---|
| B32B 7/12 | (2006.01) |
| C09J 7/02 | (2006.01) |
| C09J 133/06 | (2006.01) |
| C09J 133/14 | (2006.01) |

(52) U.S. Cl.
CPC .......... *C09J 7/0217* (2013.01); *C09J 7/0207* (2013.01); *C09J 7/0296* (2013.01); *C09J 133/066* (2013.01); *C09J 133/14* (2013.01); *C08L 2203/206* (2013.01); *C09J 2201/122* (2013.01); *C09J 2201/602* (2013.01); *C09J 2203/318* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 6,214,931 | B1 * | 4/2001 | Segers ................. | C08F 220/08 428/355 AC |
| 6,559,902 | B1 * | 5/2003 | Kusuda et al. ................. | 349/12 |
| 7,255,920 | B2 * | 8/2007 | Everaerts et al. ...... | 428/355 AC |
| 2004/0202879 | A1 * | 10/2004 | Xia et al. ...................... | 428/500 |
| 2005/0269707 | A1 | 12/2005 | Nashiki et al. | |
| 2007/0091074 | A1 | 4/2007 | Nashiki et al. | |
| 2007/0207312 | A1 | 9/2007 | Ikeya et al. | |
| 2008/0213583 | A1 * | 9/2008 | Noguchi et al. ........ | 428/355 AC |
| 2009/0087629 | A1 * | 4/2009 | Everaerts .................. | B32B 7/12 428/203 |
| 2009/0116111 | A1 | 5/2009 | Toyama et al. | |
| 2009/0160817 | A1 * | 6/2009 | Wu .......................... | G06F 3/044 345/173 |
| 2010/0143634 | A1 | 6/2010 | Yasui et al. | |
| 2010/0188620 | A1 * | 7/2010 | Kim ....................... | C09J 133/08 349/96 |
| 2012/0244348 | A1 * | 9/2012 | Park et al. ............. | 428/355 AC |
| 2013/0201145 | A1 * | 8/2013 | Park et al. ..................... | 345/173 |
| 2013/0202884 | A1 * | 8/2013 | Park et al. ..................... | 428/354 |
| 2014/0057102 | A1 * | 2/2014 | Park et al. ..................... | 428/354 |
| 2014/0134433 | A1 * | 5/2014 | Park et al. ............. | 428/355 AC |
| 2014/0134434 | A1 * | 5/2014 | Park et al. ............. | 428/355 AC |
| 2015/0050853 | A1 * | 2/2015 | Park ....................... | C09J 7/0292 442/1 |

FOREIGN PATENT DOCUMENTS

| | | |
|---|---|---|
| CN | 101010344 A | 8/2007 |
| CN | 101423736 A | 5/2009 |
| CN | 101463234 A | 6/2009 |
| CN | 101679819 A | 3/2010 |
| EP | 2048210 A1 | 10/2008 |
| JP | 60-1274 A | 1/1985 |
| JP | 05-70752 A | 3/1993 |
| JP | 2005-226029 | 8/2005 |

(Continued)

OTHER PUBLICATIONS

M.D. Gower and R.A.Shanks, "The effect of chain transfer agent level on adhesive performance and peel master-curves for acrylic pressure sensitive adhesives", 2004, Macromolecular Chemistry and Physics, pp. 2139-2150.* Donatas, Satas, "Handbook of Pressure Sensitive Adhesive Technology", 1999, Satas & Associates, 3rd edition, Chapter 19, pp. 444-459.*
Masaru, Nakayama et al., "Acrylic Pressure Sensitive Adhesive Composition and Pressure Sensitive Adhesive Tape, Label, OR Sheet", English translation of JP 05070752, published on Mar. 23, 1993.*
Ryu, Taketatsu et al., Optical Film with Pressure Sensitive Adhesive and and Optical Laminate, English translation of JP 2008-176173A, published Jul. 31, 2008.*
Database WPI, Week Jul. 1985, Thompson Scientific, London, GB, AN 1985-041670, XP-002727337.

*Primary Examiner* — Anish Desai
(74) *Attorney, Agent, or Firm* — Dentons US LLP (57) ABSTRACT

Provided are a pressure-sensitive adhesive composition for a touch panel, a conductive film, a touch panel and a pressure-sensitive adhesive film. The exemplary pressure-sensitive adhesive composition for a touch panel, the conductive film or the pressure-sensitive adhesive film has excellent durability and optical properties such as transparency. In addition, such physical properties are stably maintained under severe conditions. Particularly, a pressure-sensitive adhesive layer is attached to a conductor thin film, and thus resistance change of the conductor thin film is effectively inhibited even when the conductor thin film is exposed to the severe conditions. Therefore, the pressure-sensitive adhesive composition may be effectively used to manufacture a touch panel.

14 Claims, 2 Drawing Sheets

(56) References Cited

FOREIGN PATENT DOCUMENTS

| | | |
|---|---|---|
| JP | 2006-19239 A | 1/2006 |
| JP | 2006-261091 A | 9/2006 |
| JP | 2007-224186 A | 9/2007 |
| JP | 2008-143995 A | 6/2008 |
| JP | 2009-79203 A | 4/2009 |
| JP | 2009-91479 A | 4/2009 |
| JP | 2010-065109 | 3/2010 |
| JP | 2010-70383 A | 4/2010 |
| JP | 2011-256345 A | 12/2011 |
| KR | 1020060043847 A | 5/2006 |
| KR | 10-2008-0020534 | 3/2008 |
| KR | WO 2008130136 A1 * | 10/2008 ............ C09J 133/08 |
| WO | 2009/052111 A1 | 4/2009 |
| WO | 2010/027041 A1 | 3/2010 |
| WO | 2010/114883 A1 | 10/2010 |

* cited by examiner

PRESSURE SENSITIVE ADHESIVE COMPOSITION FOR TOUCH PANEL

This application is a National Stage Entry of International Application No. PCT/KR2011/007812, filed Oct. 20, 2011, and claims the benefit of Korean Application Nos. 10-2010-0102237 filed on Oct. 20, 2010, and 10-2011-0106917 filed on Oct. 19, 2011, all of which are hereby incorporated by reference in their entirety for all purposes as if fully set forth herein.

BACKGROUND

1. Field of the Invention

The present invention relates to a pressure-sensitive adhesive composition, a conductive film, a touch panel and a pressure-sensitive adhesive film.

2. Discussion of Related Art

A touch panel is called a touch screen and applied to various data processing terminals such as a mobile communication terminal or ATM, or displays such as a TV or monitor.

For such a touch panel, a conductive film in which a conductive layer is formed on one or both surfaces of a substrate by depositing a conductor such as indium tin oxide (ITO) may be used as a basic unit part.

In the manufacture of the touch panel, a pressure-sensitive adhesive may be used to attach the conductive film to an adherent, or form a stacked structure by stacking a conductive film. Such a pressure-sensitive adhesive is maintained transparent under severe conditions such as high temperature, high temperature and humidity, or a serious change in temperature or humidity, and requires physical properties which do not induce lift-off, peeling and curling.

Meanwhile, as the substrate of the conductive film, a plastic substrate may be used. However, the plastic substrate induces an out-gassing phenomenon in which moisture, solvents or other additives in the plastic substrate are emitted in a gas form under a heating condition. Since the emitted gas creates bubbles and thus reduces visibility, when a pressure-sensitive adhesive is in contact with the plastic substrate, the generation of bubbles from the substrate should be prevented.

In addition, when the pressure-sensitive adhesive is directly adhered to the conductive layer of the conductive film, the pressure-sensitive adhesive layer serves to prevent a resistance change in the conductive layer even when being used under severe conditions, and ensure stable drive for a long time.

SUMMARY OF THE INVENTION

The present invention is directed to providing a pressure-sensitive adhesive composition for a touch panel, a conductive film, a touch panel and a pressure-sensitive adhesive film.

In one aspect, a pressure-sensitive adhesive composition for a touch panel includes an acryl polymer including a (meth)acrylic acid ester monomer as a polymerization unit, wherein a thiol compound is bound to the acryl polymer.

The pressure-sensitive adhesive composition includes an acryl polymer. In one example, the acryl polymer may include a (meth)acrylic acid ester monomer as a polymerization unit, and a thiol compound may be bound to the acryl polymer.

As the (meth)acrylic acid ester monomer, alkyl (meth) acrylate may be used. In one example, in consideration of cohesive strength, glass transfer temperature and adhesive property of the pressure-sensitive adhesive layer, an alkyl (meth)acrylate including an alkyl group having 1 to 20 carbon atoms may be used.

Examples of the alkyl (meth)acrylate may be, but are not limited to, methyl (meth)acrylate, ethyl (meth)acrylate, n-propyl (meth)acrylate, isopropyl (meth)acrylate, butyl (meth)acrylate, t-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate and tetradecyl (meth)acrylate. Such monomers may be used alone or in combination.

In addition, as the (meth)acrylic acid ester monomer, a methyl (meth)acrylate, preferably, methyl acrylate, and a monomer represented by Formula 1 may be simultaneously used, as follow.

[Formula 1]

In Formula 1, R is hydrogen or an alkyl group having 1 to 4 carbon atoms, and $R_1$ is an alkyl group having 2 to 20 carbon atoms.

In Formula 1, the alkyl group may be linear, branched or cyclic, and preferably, linear or branched. When necessary, the alkyl group may be substituted by at least one substituent.

The pressure-sensitive adhesive composition includes an acryl polymer where a thiol compound is bound. Here, the binding may include a case of including the thiol compound in a main chain of the polymer as a polymerization unit, or a case of binding the thiol compound to an end of the main chain or as a side chain.

As the thiol compound, a compound represented by Formula 2 may be used, as follow.

[Formula 2]

In Formula 2, $R_2$ is an alkyl group or -A-C(=O)—O— $R_3$, and A is an alkylene group or alkylidene group, $R_3$ is hydrogen, an alkyl group or -D-C(-E-O—C(=O)-Q-SH)$_n$ $(R_4)_{(3-n)}$, D, E and Q are each independently an alkylene group or alkylidene group, $R_4$ is an alkyl group, and n is an integer between 1 and 3.

In the definition of Formula 2, the alkylene or alkylidene group may be a linear, branched or cyclic alkylene or alkylidene group having 1 to 20, 1 to 16, 1 to 12, 1 to 8 or 1 to 4 carbon atoms. The alkylene or alkylidene group may be optionally substituted by at least one substituent. In addition, in the definition of Formula 2, the alkyl group may be a linear, branched or cyclic alkyl group having 1 to 20, 1 to 16, 1 to 12, 1 to 8, 1 to 4, 4 to 20, 8 to 20 or 8 to 16 carbon atoms. The alkyl group may be optionally substituted by at least one substituent.

As such, as a substituent which may be substituted to the alkyl, alkylene or alkylidene group, a halogen, alkyl, alkenyl, alkynyl, epoxy, aryl, thiol, hydroxyl, amino or carboxyl group, and preferably, a hydroxyl or epoxy group may be used.

In Formula 2, $R_2$ is an alkyl group having 4 to 20 carbon atoms, an alkyl group having 8 to 20 carbon atoms, or an alkyl group having 8 to 16 carbon atoms.

Examples of the thiol compound represented by Formula 2 may include, but are not limited to, 2-mercaptoethanol, glycidyl mercaptane, mercaptoacetic acid, 2-ethylhexylthioglycolate, 2,3-dimercapto-1-propanol, n-dodecane thiol, t-butyl mercaptane, n-butyl mercaptane, 1-octadecane thiol, trimethylol propane tris(3-mercaptothiol) and pentaerythritol tetrakis(3-mercaptopropionate).

The acryl polymer may include 97 to 99.999 parts by weight of a (meth)acrylic acid ester-based monomer, and 0.001 to 3 parts by weight of a thiol compound, which are bound to each other. The acryl polymer preferably includes 0.005 to 1 or 0.01 to 0.1 parts by weight of the thiol compound. Physical properties such as initial adhesive strength, durability and peel strength of the pressure-sensitive adhesive layer may be effectively maintained by modulating the weight ratio of monomers in the above-mentioned level.

In the specification, a unit part by weight means a weight ratio of components unless specifically defined otherwise.

The acryl polymer may include a copolymerizable monomer having a crosslinkable functional group, and the copolymerizable monomer having the crosslinkable functional group means a monomer having both of a crosslinkable functional group and a functional group copolymerized with a different monomer included in the acryl polymer. Such a monomer may be included in a polymerized form in the acryl polymer and provide a crosslinkable functional group capable of reacting with a multifunctional crosslinking agent to the polymer. Examples of the crosslinkable functional group may be a hydroxyl, carboxyl, nitrogen-containing, epoxy or isocyanate group, preferably, a hydroxyl, carboxyl or nitrogen-containing group, and more preferably, a hydroxyl group. In this field, various copolymerizable monomers which can provide the crosslinkable functional group are known, and such monomers may all be used in preparation of the polymer. For example, the copolymerizable monomer having a hydroxyl group may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, the copolymerizable monomer having a carboxyl group may be (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, and the copolymerizable monomer having a nitrogen-containing group may be (meth)acrylamide, N-vinyl pyrrolidone or N-vinyl caprolactame. However, the present invention is not limited thereto.

The acryl polymer may include 80 to 99.9 parts by weight of a (meth)acrylic acid ester monomer, 0.01 to 20 parts by weight of a copolymerizable monomer having a crosslinkable functional group, and 0.001 to 3 parts by weight of a thiol compound. In one example, the acryl polymer includes 0.005 to 1 parts by weight or 0.01 to 0.1 parts by weight of a thiol compound. In the above range, physical properties such as initial adhesive strength, durability and peel strength of the pressure-sensitive adhesive layer may be effectively maintained.

The acryl polymer may be prepared by a conventional polymerization method known in the art, for example, solution polymerization, photo polymerization, bulk polymerization, suspension polymerization or emulsion polymerization.

The acryl polymer may have a weight average molecular weight ($M_w$) of 300,000 to 2,500,000, 400,000 to 2,000,000, or 500,000 to 1,500,000. In the specification, a weight average molecular weight may mean a numerical value converted with respect to reference polystyrene measured by gel permeation chromatography (GPC). In addition, in the specification, unless specifically defined otherwise, the term "molecular weight" means a weight average molecular weight. When the weight average molecular weight of the acryl polymer is excessively low, durability may be reduced, and when the weight average molecular weight of the acryl polymer is excessively high, workability such as coatability may be reduced, or ability of preventing curling may be reduced. Therefore, the weight average molecular weight is preferably modulated in the above-mentioned range.

The acryl polymer may have a polydispersity index of 4.0 or less, or 3.5 or less.

The polydispersity index is a numerical value ($M_w/M_n$) obtained by dividing weight average molecular weight ($M_w$) of an acryl polymer by number average molecular weight ($M_n$) of the polymer. The weight average molecular weight and number average molecular weight of the acryl polymer may be measured by gel permeation chromatography (GPC). When an acryl polymer having a polydispersity index of 4.0 or less is used, a free volume of the pressure-sensitive adhesive layer may be appropriately modulated, and thus degradation in visibility or other optical properties, which are caused by penetration of oxygen, moisture or other impurities into an interface between the pressure-sensitive adhesive layer and the adherent, or bubbles generated at a pressure-sensitive adhesive interface due to out-gassing, may be effectively prevented. Particularly, when the pressure-sensitive adhesive layer is directly adhered to a conductive thin film, even when exposed to sever conditions, the pressure-sensitive adhesive layer may effectively inhibit a change in resistance of the conductive thin film. Therefore, the touch panel may be stably driven for a long time. As the polydispersity index of the acryl polymer decreases, a free volume of the pressure-sensitive adhesive decreases more, and the above-mentioned effect increases. Accordingly, the lower limit of the polydispersity index is not particularly limited, but may be approximately 0.5 or more, 1.0 or more, 1.5 or more, or 2.0 or more.

The pressure-sensitive adhesive composition may include a multifunctional crosslinking agent crosslinking the acryl polymer. In one example, the acryl polymer may be included in a pressure-sensitive adhesive layer while being crosslinked by the multifunctional crosslinking agent. The multifunctional crosslinking agent may provide a crosslink structure through a reaction with a crosslinkable functional group present in the acryl polymer.

The kind of multifunctional crosslinking agent is not particularly limited. In one example, the pressure-sensitive adhesive layer may be a thermosetting pressure-sensitive adhesive layer, which may use a multifunctional crosslinking agent crosslinking an acryl-based polymer. As such a crosslinking agent, an isocyanate crosslinking agent, an epoxy crosslinking agent, an aziridin crosslinking agent, or a metal chelate crosslinking agent may be used. A suitable crosslinking agent may be selected according to the kind of crosslinkable functional groups included in the pressure-sensitive adhesive composition. As the isocyanate crosslinking agent, tolylene diisocyanate, xylene diisocyanate, diphenylmethane diisocyanate, hexamethylene diisocyanate, isophorone diisocyanate, tetramethylxylene diisocyanate, naphthalene diisocyanate, or toluene diisocyanate may be used. An addition-reaction product between at least one of the above-mentioned isocyanate crosslinking agents and a polyol may also be used. Here, the polyol may be trimethylolpropane. In addition, as an epoxy crosslinking agent, at least one or two of ethyleneglycol diglycidylether, triglycidylether, trimethylolpropane triglycidylether, N,N,N',N'-tetraglycidyl ethylenediamine or glycerin diglycidylether may be used. As the aziridine crosslinking agent, at least one or two of N,N'-toluene-2,4-bis(1-aziridine carboxamide), N,N'-diphenylmethane -4,4'-bis(1-aziridine carboxamide), triethylenemelamine, bisisoprothaloyl-1-(2-methylaziridine) or tri-1-aziridinyl phosphine oxide may be used. As the metal chelate crosslinking agent, a compound in which a polyvalent metal is coordinated to acetyl acetone or ethyl acetoacetate may be used. Here, as the polyvalent metal, aluminum, iron, zinc, tin, titanium, antimony, magnesium or vanadium may be used.

The pressure-sensitive adhesive composition may include 0.01 to 5 parts by weight, 0.01 to 3 parts by weight, or 0.1 to 1 part by weight of the multifunctional cros slinking agent with respect to 100 parts by weight of the acryl polymer. In such a range, durability and adhesive properties of the pressure-sensitive adhesive layer may be effectively controlled.

The pressure-sensitive adhesive composition may further include at least one or two additives of a silane coupling agent, a tackifier, an epoxy resin, a UV stabilizer, an oxidation preventing agent, a coloring agent, a reinforcing agent, a filler, a foaming agent, a surfactant or a plasticizer, in addition to the above-mentioned components.

The pressure-sensitive adhesive composition may meet the condition of Equation 1.

$$\Delta R=[(R-R_i)/R_i]\times 100\leq 15\% \quad \text{[Equation 1]}$$

In Equation 1, $\Delta R$ is a resistance change ratio (%), $R_i$ is an initial resistance of the ITO electrode measured after the pressure-sensitive adhesive layer which is a cured product of the pressure-sensitive adhesive composition is attached to the ITO electrode, R is a resistance of the ITO electrode measured after the ITO electrode to which the pressure-sensitive adhesive layer is attached is maintained at 60° C. and a relative humidity of 90% for 240 hours.

The resistance change ratio ($\Delta R$) of Equation 1 may be more specifically measured by a method as will be described in the following Examples. The resistance change ratio is preferably 10% or less. As the resistance change ratio decreases, the lower limit thereof is not limited. For example, the lower limit of the resistance change ratio may be 0%.

The pressure-sensitive adhesive layer may be formed by drying, aging, crosslinking and/or curing the pressure-sensitive adhesive composition or coating solution prepared by blending components such as the acryl polymer, thiol compound and multifunctional cros slinking agent.

The conductive film according to one exemplary embodiment of the present invention may include a substrate, and a pressure-sensitive adhesive layer, which is a cured product of a pressure-sensitive adhesive composition formed on one or both surfaces of the substrate. The pressure-sensitive adhesive composition forming the pressure-sensitive adhesive layer may be the pressure-sensitive adhesive composition described above.

Figure 1:
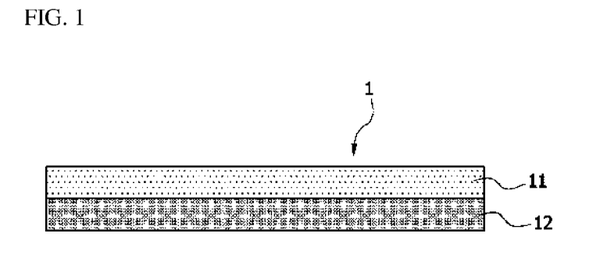
FIGS. 1 and 2 are schematic diagrams of a conductive film according to one exemplary embodiment.

FIG. 1 shows an exemplary conductive film 1, and the film 1 includes a substrate 12 and a pressure-sensitive adhesive layer 11 formed on one surface of the substrate 12.

As the substrate of the conductive film, a conventional transparent film or sheet known in the art may be used. As the substrate, glass or plastic may be used. As a glass substrate, a substrate formed of soda lime glass, glass containing barium/strontium, lead glass, alumino silicon glass, borosilicate glass, barium borosilicate glass or quartz may be used. In addition, as a plastic substrate, a polyester substrate, an acryl resin substrate, a polycarbonate substrate, a polyamide substrate, a polyester substrate, an acryl resin substrate, a polycarbonate substrate, a polyamide substrate, a polyvinylchloride substrate, a polystyrene substrate or a polyolefin substrate, and preferably, a polyester substrate such as poly(ethylene)terephthalate (PET) or polycarbonate substrate, may be used. To realize a lighter and thinner substrate, a plastic substrate may be used as the substrate, but the present invention is not limited thereto.

The thickness of the substrate is not particularly limited, and thus may be appropriately modulated according to where the substrate is applied. In one example, the substrate may have a thickness of approximately 3 to 300 μm, approximately 5 to 250 μm, or approximately 10 to 200 μm.

Figure 2:
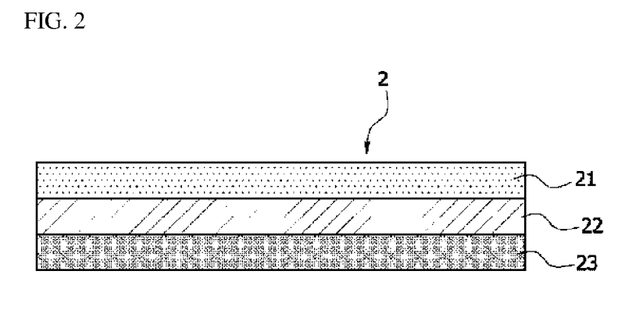

In one example, a conductive layer may be formed on one or both surfaces of the substrate. When the conductive layer is formed on the substrate, the pressure-sensitive adhesive layer may be attached to the conductive layer formed on the substrate. FIG. 2 is an exemplary film 2 having a conductive layer 22, and in FIG. 2, a pressure-sensitive adhesive layer 21 is directly attached to the conductive layer 22.

The conductive layer may be formed of a metal such as gold, silver, platinum, palladium, copper, aluminum, nickel, chromium, titanium, iron, cobalt or tin; an alloy of at least two thereof; a metal oxide composed of indium oxide, tin indium oxide, tin oxide, titanium oxide, cadmium oxide or a mixture of at least two thereof; or another conductive metal oxide formed of copper iodide. The conductive layer may be a crystal layer or non-crystal layer. To form a conductive layer, indium tin oxide (ITO) is conventionally used, but the present invention is not limited thereto. In addition, the thickness of the conductive layer may be modulated to approximately 10 to 300 nm, or approximately 10 to 200 nm in consideration of ability to form a continuous film, conductivity and transparency.

The conductive layer may be formed by a method of forming a thin film such as, for example, vacuum deposition, sputtering, ion plating, spray pyrolysis, chemical plating, electroplating or a combination of at least two thereof.

The conductive layer may be formed on the substrate by means of an anchor layer or dielectric layer. The anchor layer or dielectric layer may increase cohesiveness between the conductive layer and the substrate, and improve scratch resistance or elasticity. The anchor layer or dielectric layer may be formed using an inorganic material such as $SiO_2$, $MgF_2$ or $Al_2O_3$; an organic material such as a acryl resin, an urethane resin, a melamine resin, an alkyd resin or siloxane polymer or a mixture of at least two thereof. The dielectric layer or anchor layer may be formed by vacuum deposition, sputtering, ion plating or coating. The anchor layer or dielectric layer may conventionally be formed to a thickness of approximately 100 nm or less, 15 to 100 nm, or 20 to 60 nm.

The surface of the substrate having the conductive layer may undergo an appropriate adhesion treatment such as corona discharging, UV irradiation, plasma treatment or sputter etching treatment.

Figure 3:
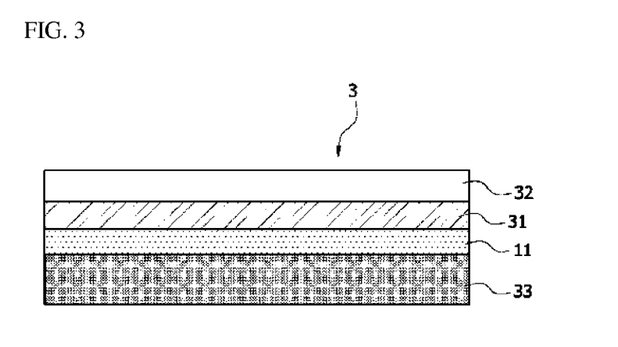
FIGS. 3 and 4 show a structure of a touch panel according to one exemplary embodiment.

The conductive film may further include a plate having a hard coating layer formed on one surface thereof, and have a structure in which the pressure-sensitive adhesive layer of the conductive film is attached to the hard coating layer. FIG. 3 shows an example of the above structure in which a plate 32, a hard coating layer 31, a pressure-sensitive adhesive layer 11 and a substrate 33 are sequentially formed.

As the plate, a glass or plastic substrate, which has been previously described as the material for the substrate, may be used, and preferably a plastic material may be used.

In addition, the hard coating layer may be formed by coating a hard resin such as an acrylurethane resin or siloxane resin, and curing the resin. The hard coating layer may be conventionally formed to a thickness between 0.1 and 30 µm.

Figure 4:
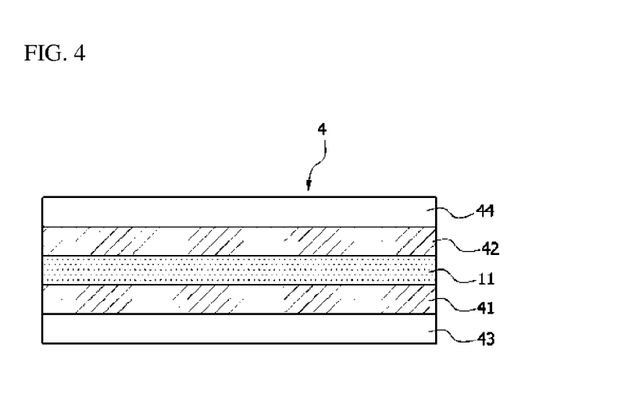

The conductive film may further include a plate having a conductive layer formed on at least one surface thereof, and the pressure-sensitive adhesive layer of the conductive film may be attached to the conductive layer formed on the plate. Particularly, as described above, when a conductive layer is formed on the substrate, the pressure-sensitive adhesive layer may attach the conductive layer of the plate to the conductive layer of the substrate as the pressure-sensitive adhesive layer is in contact with the conductive layers of the plate and the substrate. FIG. 4 shows an example of the above structure in which a plate 44, a conductive layer 42, a pressure-sensitive adhesive layer 11, a conductive layer 41 and a substrate 43 are sequentially formed.

As the plate, a glass or plastic substrate, which has been previously described as the substrate may be used, and preferably a plastic substrate may be used. The conductive layer on the plate may be formed using the above-described method and material.

In another aspect, a touch panel is provided. The touch panel according to one exemplary embodiment of the present invention includes the conductive film.

As long as the touch panel includes the conductive film, the touch panel may be manufactured in a resistive type, a capacitance type or another type, and may have various structures for the resistive type or capacitance type. For example, when the touch panel is in a resistive type, the conductive film may be used in one or both of two transparent electrodes facing each other. In addition, when the touch panel is in a capacitance type, the conductive film may be used in manufacture of a device for sensing an electrostatic capacity generated when the human body or specific material is in contact with the touch panel. However, the conductive film may be applied to other necessary cases without limitations.

As long as the touch panel is formed using the conductive film, other parts or a type of forming the touch panel are not particularly limited, but may use conventional parts or type applied to the art.

In still another aspect, a pressure-sensitive adhesive film for a touch panel is provided. The pressure-sensitive adhesive film according to one exemplary embodiment may have a pressure-sensitive adhesive layer including a cured product of the pressure-sensitive adhesive composition.

The cured product of the pressure-sensitive adhesive composition may be produced by drying, heating or aging a pressure-sensitive adhesive composition including, for example, an acryl polymer where a (meth)acrylic acid ester monomer is included as a polymerization unit and a thiol compound is bound, under appropriate conditions, and crosslinking the composition with a multifunctional crosslinking agent.

In addition, the pressure-sensitive adhesive film may further include a substrate, and have a structure in which the pressure-sensitive adhesive layer is formed on the substrate. In another aspect, the pressure-sensitive adhesive film may have a structure in which a pressure-sensitive adhesive layer is interposed between two releasing films. Here, kinds of the substrate and releasing film are not particularly limited, and thus those conventionally used in the art may be used.

Figure 5:
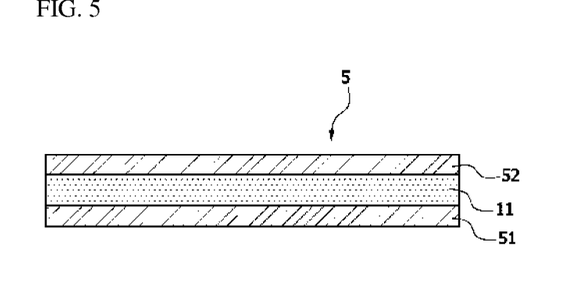
FIG. 5 is a schematic diagram of an adhesive film according to one exemplary embodiment.

FIG. 5 shows a pressure-sensitive adhesive film 5 according to one exemplary embodiment, which may include a pressure-sensitive adhesive layer 11 interposed between two releasing films 51 and 52.

When the pressure-sensitive adhesive film includes two releasing films, peel strength of the pressure-sensitive adhesive layer with respect to one releasing film may be different from that of the other releasing film. For example, in the structure shown in FIG. 5, the peel strength of the pressure-sensitive adhesive layer 11 with respect to one releasing film 52 may be set higher than that of the pressure-sensitive adhesive layer 11 with respect to the other releasing film 51. The adhesive film having such a structure may be formed by suitably selecting the kind of releasing film, or modulating the cure degree of the pressure-sensitive adhesive layer 11.

The pressure-sensitive adhesive film described above may be manufactured by coating the pressure-sensitive adhesive composition or a coating solution whose viscosity is modulated by diluting the composition in a suitable solvent on a releasing film, forming a pressure-sensitive adhesive layer by curing the composition or coating solution, and laminating another releasing film. In addition, the coating may not be necessarily performed on a releasing film, or may be performed on another suitable process substrate. In addition, the curing process may be performed, for example, by drying the coated layer under suitable conditions, or by crosslinking an acryl polymer with a multifunctional crosslinking agent by heating after or together with a drying process. The crosslinking process may not be necessarily performed in the process of forming the pressure-sensitive adhesive layer, or may be performed at a subsequent suitable time, for example, when the adhesive film is applied to the touch panel.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

DETAILED DESCRIPTION OF EXEMPLARY EMBODIMENTS

Hereinafter, the present invention will be described in detail with reference to Examples according to the present invention and Comparative Examples not according to the present invention, but the scope of the present invention is not limited to the following examples.

PREPARATION EXAMPLES

Preparation of Acryl Polymer

Preparation Example 1

69 parts by weight of n-butyl acrylate (n-BA), 30 parts by weight of methyl acrylate (MA) and 1 part by weight of 2-hydroxyethyl methacrylate (2-HEMA) were put into a 1 L reactor in which a cooling apparatus was equipped to reflux nitrogen gas and facilitate temperature control. 120 parts by weight of ethylacetate (EAc) was added as a solvent, and 0.01 parts by weight of n-dodecane thiol was added as a thiol compound.

To remove oxygen, the inside of the reactor was purged with a nitrogen gas for 60 minutes, temperature was maintained at 60° C., 0.04 parts by weight of azobisisobutyronitrile (AIBN) was added as an initiator, and the reaction was then performed for 8 hours. After the reaction, the product was diluted with ethylacetate (EAc), thereby preparing an acryl polymer solution having a solid content of 30 wt %, a weight average molecular weight of 1,200,000, and a polydispersity index (PDI) of 2.7.

Preparation Example 2

An acryl polymer solution having a solid content of 30 wt %, a weight average molecular weight of 800,000, and a polydispersity index (PDI) of 2.6 was prepared by the same method as described in Preparation Example 1, except that 0.03 parts by weight of a thiol compound was used.

Preparation Example 3

An acryl polymer solution having a solid content of 30 wt %, a weight average molecular weight of 500,000, and a polydispersity index (PDI) of 2.4 was prepared by the same method as described in Preparation Example 1, except that 0.05 parts by weight of a thiol compound was used.

Preparation Example 4

An acryl polymer solution having a solid content of 30 wt %, a weight average molecular weight of 450,000, and a polydispersity index (PDI) of 2.4 was prepared by the same method as described in Preparation Example 1, except that a monomer mixture composed of 59 parts by weight of n-butyl acrylate (n-BA), 40 parts by weight of methyl acrylate (MA), 1 part by weight of 2-hydroxyethyl methacrylate (2-HEMA), and 0.06 parts by weight of a thiol compound were used.

Preparation Example 5

An acryl polymer solution having a solid content of 30 wt %, a weight average molecular weight of 600,000, and a polydispersity index (PDI) of 5.2 was prepared by the same method as described in Preparation Example 1, except that a thiol compound was not used.

Preparation Example 6

An acryl polymer solution having a solid content of 30 wt %, a weight average molecular weight of 1,200,000, and a polydispersity index (PDI) of 5.6 was prepared by the same method as described in Preparation Example 4, except that a thiol compound was not used.

EXAMPLES

Manufacture of Pressure-Sensitive Adhesive Film

Example 1

A pressure-sensitive adhesive composition was prepared by uniformly mixing 0.3 parts by weight of an isocyanate crosslinking agent (toluene diisocyanate; TDI) with respect to 100 parts by weight of a solid of the acryl polymer solution prepared in Preparation Example 1.

A pressure-sensitive adhesive layer was formed to a thickness of 50 μm by coating the prepared composition on a releasing-treated surface of a poly(ethylene terephthalate) (PET) film (thickness: 50 μm), and maintaining the coated product at 120° C. for 3 minutes. Subsequently, a pressure-sensitive adhesive film was prepared by attaching the releasing-treated surface of the PET film with a thickness of 50 μm to the pressure-sensitive adhesive layer.

Example 2

A pressure-sensitive adhesive film was prepared by the same method as described in Example 1, except that the acryl polymer solution prepared in Preparation Example 2 was used.

Example 3

A pressure-sensitive adhesive film was prepared by the same method as described in Example 1, except that the acryl polymer solution prepared in Preparation Example 3 was used.

Example 4

A pressure-sensitive adhesive film was prepared by the same method as described in Example 1, except that the acryl polymer solution prepared in Preparation Example 4 was used.

Comparative Example 1

A pressure-sensitive adhesive film was prepared by the same method as described in Example 1, except that the acryl polymer solution prepared in Preparation Example 5 was used.

Comparative Example 2

A pressure-sensitive adhesive film was prepared by the same method as described in Example 1, except that the acryl polymer solution prepared in Preparation Example 6 was used.

Experimental Example 1

Durability Test

A sample was prepared by attaching a hard coating surface of a polyethyleneterephthalate film (thickness: 100 μm) having hard coatings formed on both surfaces thereof to a polycarbonate sheet (thickness: 1 mm) by means of a pressure-sensitive adhesive layer, cutting the resulting product to a size of 50 mm (width)×100 mm (length), and putting the cut product in an autoclave at 60° C. under 5 atm for 30 minutes.

Afterward, the sample was left at 80° C. for 240 hours, and then durability was evaluated.

Durability was evaluated by observing whether or not bubbles were generated and lift-off/peeling occurred when the sample was left under the above-mentioned conditions, and specific criteria for evaluating respective properties are as follows:

Meanwhile, bubble size was measured by introducing an image taken by an optical microscope to an image analyzer program.

<Criteria for Evaluating Ability of Inhibiting Bubble Generation>

O: When bubbles were not observed or it was observed that a small amount of bubbles having a diameter of 100 μm or less were dispersed at a pressure-sensitive adhesive interface X: When bubbles having a diameter of 100 μm or more, or groups of bubbles having a diameter of 100 μm or less were observed at a pressure-sensitive adhesive interface <Criteria for Evaluating Lift-off/Peeling>

O: When there was no lift-off/peeling at a pressure-sensitive adhesive interface X: When lift-off/peeling occurred at a pressure-sensitive adhesive interface Experimental Example 2

Evaluation of Curling

A curling level was evaluated by measuring the longest length of a sample from the bottom when the sample was put down on the ground under the thermal resistant condition.

Experimental Example 3

Resistance Change Measurement Test

Figure 6:
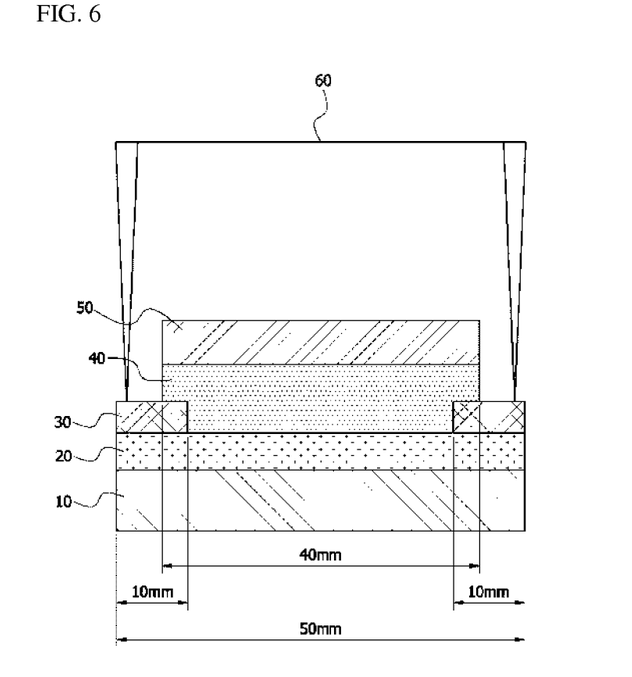
FIG. 6 is a diagram illustrating a method of measuring a resistance change ratio.

Resistance change ratio was measured by the method shown in FIG. 6. A PET film 10 having an ITO thin film 20 formed on one surface thereof (hereinafter, "conductive PET", an ITO film produced by Oike, Name: KA500PS1-175-UH/P, Crystalline ITO) was cut into a size of 30 mm×50 mm (width x length). Subsequently, as shown in FIG. 6, silver pastes 30 were applied to both ends of the film 10 to a width of 10 mm, and plasticized at 150° C. for 30 minutes. Afterward, pressure-sensitive adhesive films having releasing films 50 attached to both surfaces thereof, as manufactured in Examples and Comparative Examples, were cut into a size of 30 mm×40 mm (width×length), the releasing film was removed from one surface of the pressure-sensitive adhesive film, and then a pressure-sensitive adhesive layer 40 was attached to the plasticized film. The attachment was performed to match a center of the pressure-sensitive adhesive layer with centers of the conductive PETs 10 and 20. Then, an initial resistance $R_i$ of the ITO thin film 20 was measured using a conventional resistance measurer 60. After measuring the initial resistance, the sample having a structure of FIG. 6 was left at 60° C. and 90% relative humidity for 240 hours, and resistance of the ITO thin film 20 was measured again using the measurer 60. Each value was put into Equation 1 to measure a resistance change ratio (AR).

Experimental Example 4

Measurement of Weight Average Molecular Weight and Polydispersity Index (PDI)

Weight average molecular weight and polydispersity index of an acryl polymer were measured using GPC under the following conditions. To prepare a calibration curve, measurement results were converted using standard polystyrene produced by Agilent System.

<Conditions for Measuring Weight Average Molecular Weight>

Measurer: Agilent GPC (Agilent 1200 series, USA)
Column: Two PL Mixed Bs connected
Column Temperature: 40° C.
Eluent: Tetrahydrofuran
Flow Rate: 1.0 mL/min
Concentration:~2 mg/mL (100 μL injection)

The polydispersity index (PDI) was calculated by dividing the weight average molecular weight ($M_w$) of the acryl polymer by a number average molecular weight ($M_n$) of the polymer.

Result data of each sample obtained by the above method are shown in Table 1.

TABLE 1

|  |  | Example 1 | Example 2 | Example 3 | Example 4 | Comparative Example 1 | Comparative Example 2 |
|---|---|---|---|---|---|---|---|
| Pressure-sensitive Adhesive Resin | Preparation Method | Preparation Example 1 | Preparation Example 2 | Preparation Example 3 | Preparation Example 4 | Preparation Example 5 | Preparation Example 6 |
|  | Monomer Compositions (part(s) by weight) | BA/MA/HEMA 69/30/1 | BA/MA/HEMA 69/30/1 | BA/MA/HEMA 69/30/1 | BA/MA/HEMA 59/40/1 | BA/MA/HEMA 69/30/1 | BA/MA/HEMA 59/40/1 |
|  | Thiol Compound (n-dodecane thiol, part(s) by weight) | 0.01 | 0.03 | 0.05 | 0.06 | — | — |
|  | Molecular weight ($M_w$) | 1200000 | 850000 | 500000 | 450000 | 600000 | 1200000 |
|  | PDI | 2.7 | 2.6 | 2.4 | 2.4 | 5.2 | 5.6 |
| Crosslinking Agent | TDI series | 0.3 | 0.3 | 0.3 | 0.3 | 0.3 | 0.3 |
| Ability of inhibiting bubble generation |  | O | O | O | O | Fine Bubbles | O |
| Lift-off/peeling |  | O | O | O | O | O | O |
| Ability of preventing curling |  | 0.6 mm | 0.1 mm | 0.6 mm | 0.6 mm | 1.2 mm | 0.8 mm |
| Resistance Change |  | 6% | 5% | 4% | 4% | 18% | 20% |

The pressure-sensitive adhesive composition for a touch panel, the conductive film or the pressure-sensitive adhesive film according to one exemplary embodiment of the present invention have excellent durability and optical properties such as transparency. In addition, such physical properties are stably maintained under severe conditions. Particularly, in the present invention, a pressure-sensitive adhesive layer is attached to a conductor thin film, and thus resistance change of the conductor thin film is effectively inhibited even when the conductor thin film is exposed to the severe conditions.

While the invention has been shown and described with reference to certain exemplary embodiments thereof, it will be understood by those skilled in the art that various changes in form and details may be made therein without departing from the scope of the invention as defined by the appended claims.

REFERENCE SIGNS LIST 1, 2: conductive film
3, 4: touch panel
11, 21: pressure-sensitive adhesive layer
12, 23, 33, 43: substrate
32, 44: plate
22, 41, 42: conductive layer
31: hard coating layer
5: pressure-sensitive adhesive film
51, 52: releasing film
10: PET film
20: ITO thin film
30: silver paste
40: pressure-sensitive adhesive layer
50: releasing film
60: resistance measurer

What is claimed is:

1. A capacitance touch panel including a conductive film, comprising:
    a substrate;
    a conductive layer on at least one surface of the substrate; and
    a pressure-sensitive adhesive layer including a pressure-sensitive adhesive composition in a cured state,
    wherein the pressure-sensitive adhesive layer directly covers an entire surface of the conductive layer,
    wherein the pressure-sensitive adhesive composition comprises an acryl polymer having a polydispersity index of 4.0 or less, wherein the acryl polymer comprises 97 to 99.999 parts by weight of a (meth)acrylic acid ester-based monomer and 0.005 to 1 parts by weight of a thiol compound,
    wherein the (meth)acrylic acid ester-based monomer includes a methyl (meth)acrylate monomer and a monomer represented by Formula 1;
    wherein the thiol compound binds to the acryl polymer, and
    wherein the thiol compound is represented by Formula 2:

[Formula 1]

wherein R is hydrogen or an alkyl group having 1 to 4 carbon atoms, and $R_1$ is an alkyl group having 2 to 20 carbon atoms;

HS—$R_2$ [Formula 2]

wherein $R_2$ is an alkyl group or -A-C(=O)—O—$R_3$, A is an alkylene group or alkylidene group, $R_3$ is hydrogen, an alkyl group or -D-C(-E-O—C(=O)-Q-SH)$_n$ $(R_4)_{(3-n)}$, D, E and Q are each independantly an alkylene group or alkylidene group, $R_4$ is an alkyl group, and n is an integer between 1 and 3.

2. The capacitance touch panel according to claim 1, wherein $R_2$ is an alkyl group having 4 to 20 carbon atoms.

3. The capacitance touch panel according to claim 1, wherein the acryl polymer further comprises copolymerizable monomers having a crosslinkable functional group in a polymerized form.

4. The capacitance touch panel according to claim 3, wherein the crosslinkable functional group is a carboxyl group, a hydroxyl group, a nitrogen-containing group, an epoxy group or an isocyanate group.

5. The capacitance touch panel according to claim 1, wherein the pressure-sensitive adhesive composition further comprises a multifunctional crosslinking agent crosslinking the acryl polymer.

6. The capacitance touch panel according to claim 5, wherein the multifunctional crosslinking agent is an isocyanate crosslinking agent, an epoxy crosslinking agent, an aziridine crosslinking agent, or a metal chelate crosslinking agent.

7. The capacitance touch panel according to claim 1, wherein the substrate is a plastic substrate.

8. A capacitance touch panel including a conducive film, comprising:
    a substrate;
    a first conductive layer formed on the substrate;
    a pressure-sensitive adhesive layer including a pressure-sensitive adhesive composition in a cured state; and
    a plate on which a second conductive layer is formed on one surface thereof,
    wherein the pressure-sensitive adhesive layer directly covers an entire surface of the first conductive layer formed on the substrate and an entire surface of the second conductive layer formed on the plate,
    wherein the pressure-sensitive adhesive composition comprises an acryl polymer having a polydispersity index of 4.0 or less, wherein the acryl polymer comprises 97 to 99.999 parts by weight of a (meth)acrylic acid ester-based monomer and 0.005 to 1 parts by weight of a thiol compound,
    wherein the (meth)acrylic acid ester-based monomer includes a methyl (meth)acrylate monomer and a monomer represented by Formula 1;
    wherein the thiol compound binds to the acryl polymer, and
    wherein the thiol compound is represented by Formula 2:

[Formula 1]

wherein R is hydrogen or an alkyl group having 1 to 4 carbon atoms, and $R_1$ is an alkyl group having 2 to 20 carbon atoms;

HS—$R_2$ [Formula 2]

wherein $R_2$ is an alkyl group or -A-C(=O)—O—$R_3$, A is an alkylene group or alkylidene group, $R_3$ is hydrogen, an alkyl group or -D-C(-E-O—C(=O)-Q-SH)$_n$ $(R_4)_{(3-n)}$, D, E and Q are each independantly an alkylene group or alkylidene group, $R_4$ is an alkyl group, and n is an integer between 1 and 3.

9. The capacitance touch panel according to claim 8, wherein $R_2$ is an alkyl group having 4 to 20 carbon atoms.

10. The capacitance touch panel according to claim 8, wherein the acryl polymer further comprises copolymerizable monomers having a crosslinkable functional group in a polymerized form.

11. The capacitance touch panel according to claim 10, wherein the crosslinkable functional group is a carboxyl group, a hydroxyl group, a nitrogen-containing group, an epoxy group or an isocyanate group.

12. The capacitance touch panel according to claim 8, wherein the pressure-sensitive adhesive composition further comprises a multifunctional crosslinking agent crosslinking the acryl polymer.

13. The capacitance touch panel according to claim 12, wherein the multifunctional crosslinking agent is an isocyanate crosslinking agent, an epoxy crosslinking agent, an aziridine crosslinking agent, or a metal chelate crosslinking agent.

14. The capacitance touch panel according to claim 8, wherein the substrate is a plastic substrate.

\* \* \* \* \*